US012665915B2

(12) United States Patent
Sergeev

(10) Patent No.: US 12,665,915 B2
(45) Date of Patent: Jun. 23, 2026

(54) SYSTEM AND METHOD FOR USING LARGE LANGUAGE MODELS TO RESPOND TO INFORMATION SECURITY INCIDENTS

(71) Applicant: AO Kaspersky Lab, Moscow (RU)

(72) Inventor: Victor G. Sergeev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 64 days.

(21) Appl. No.: 18/599,434

(22) Filed: Mar. 8, 2024

(65) Prior Publication Data

US 2025/0016183 A1    Jan. 9, 2025

(30) Foreign Application Priority Data

Jul. 6, 2023    (RU) ................................. 2023117904

(51) Int. Cl.
H04L 9/40          (2022.01)
(52) U.S. Cl.
CPC ...... *H04L 63/1425* (2013.01); *H04L 63/1416* (2013.01); *H04L 63/1441* (2013.01)
(58) Field of Classification Search
CPC ............. H04L 63/1416; H04L 63/1425; H04L 63/1441
See application file for complete search history.

(56) References Cited

U.S. PATENT DOCUMENTS 8,776,241 B2    7/2014  Zaitsev
11,829,486 B1 *  11/2023  Lambotte ................. G06N 3/09

2014/0372105 A1    12/2014  Manadhata et al.
2017/0243008 A1 *  8/2017  Cornell ............... H04L 63/1408
2017/0262633 A1 *  9/2017  Miserendino ......... G06F 21/564
2023/0306112 A1 *  9/2023  Jung ....................... G06F 16/28
2023/0396638 A1 *  12/2023  Hebbagodi ............. H04L 63/20
(Continued)

FOREIGN PATENT DOCUMENTS

CN          116319005 A      6/2023

OTHER PUBLICATIONS

Bubeck et al., "Sparks of Artificial General Intelligence: Early experiments with GPT-4", Available online at: < https://arxiv.org/pdf/2303.12712>, Apr. 13, 2023, 155 pages.
(Continued)

*Primary Examiner* — Mohamed A. Wasel
(74) *Attorney, Agent, or Firm* — ArentFox Schiff LLP; Michael Fainberg

(57)          ABSTRACT

An exemplary method for security monitoring and incident response using large language models comprises: receiving input data from elements of Security Operations Center (SOC), generating and sending a query based on the received input data to a Large Language Model (LLM), parsing a response received from the LLM, and performing analysis to determine whether a threat has been identified. In one aspect, the method further comprises: when a threat is identified, collecting artifacts of the threat, and analyzing the threat further with involvement of security professionals, when a threat is not identified, determining whether additional data is needed, and when additional data is needed, determining a type of the additional data, when the type of additional data that is determined, collecting additional information from elements of the SOC, and when additional data is not needed, terminating the incident response.

18 Claims, 3 Drawing Sheets

(56)  References Cited

U.S. PATENT DOCUMENTS

| | | | | |
|---|---|---|---|---|
| 2024/0265106 | A1* | 8/2024 | Mehta | G06F 21/57 |
| 2024/0370570 | A1* | 11/2024 | Betthauser | G06F 21/577 |
| 2024/0372876 | A1* | 11/2024 | Shachar | H04L 41/16 |
| 2024/0386490 | A1* | 11/2024 | Nasir | G06Q 40/03 |
| 2024/0403428 | A1* | 12/2024 | Lal | G06F 21/566 |
| 2024/0406518 | A1* | 12/2024 | Candelore | H04N 21/42209 |
| 2024/0414211 | A1* | 12/2024 | Boyer | H04L 63/1416 |
| 2024/0419803 | A1* | 12/2024 | Blum | G06F 21/577 |
| 2024/0427879 | A1* | 12/2024 | Bulut | G06F 21/552 |
| 2025/0371146 | A1* | 12/2025 | Miserendino | G06F 21/564 |

OTHER PUBLICATIONS

European Search Report received for Patent Application No. 24186270.5 , mailed on Sep. 2, 2024, 12 pages.
Gupta et al., "From ChatGPT to ThreatGPT: Impact of Generative AI in Cybersecurity and Privacy", Available online at: <https://arxiv.org/pdf/2307.00691>, Jul. 3, 2023, 27 pages.
Kucharavy et al., "Fundamentals of Generative Large Language Models and Perspectives in Cyber-Defense", Available onilne at: <https://arxiv.org/pdf/2303.12132>, Mar. 21, 2023, 50 pages.
Perera et al., "The Next Gen Security Operation Center", 2021 6th International Conference for Convergence in Technology (I2CT), Apr. 2021, 9 pages.

* cited by examiner

<u>200</u>

1

SYSTEM AND METHOD FOR USING LARGE LANGUAGE MODELS TO RESPOND TO INFORMATION SECURITY INCIDENTS

CROSS REFERENCE TO RELATED APPLICATIONS

The present application claims priority to Russian Patent Application No. RU2023117904, filed on 6 Jul. 2023, the entire content of which is incorporated herein by reference.

FIELD OF TECHNOLOGY

The present disclosure relates to the field of information technology, and more specifically to systems and methods of using large language models in security monitoring and incident response.

BACKGROUND

At the moment, more and more companies are using Security Operations Centers (SOC), which is due to the growing number of information threats, the complexity of the company's infrastructure, as well as the requirements from authorities and regulators to protect user data from theft or illegal use. In recent years, the average amount of damage from an information security incident (hereinafter referred to as the incident) has also increased. These incidents are related to the penetration of the company's infrastructure, and the medium amount of damage exceeded $5 million for 2022 according to cost of data breach Report by IBM.

SOC specialists process data (so-called artifacts, i.e. documents and other files related to the incident) collected from employee workplaces, network devices, and other computer infrastructure in order to detect and stop the development of a possible incident into an attack as early as possible. For monitoring and data collection, specialists can use SIEM (Security Information and Event Management) solutions and EDR (Endpoint Detection and Response) products, such as Kaspersky Unified Monitoring and Analysis Platform, as well as Intrusion Prevention System (IPS) and User and Entity Behavior Analytics (UEBA) systems.

Based on data that may indicate a possible incident, SOC determines whether there is a threat and, if so, what its parameters are, such as the type (e.g., inappropriate content, unauthorized access, information leakage) or source (e.g., on which computer the spyware was detected). If a possible incident is detected, measures are taken to eliminate it and minimize the damage.

Despite the fact that many functions of various SIEM solutions are automated, the expertise of a computer security specialist is still used to correctly identify an incident, which can lead to the omission of possible incidents, since a person may not always have access to up-to-date information regarding the most recent incidents and related artifacts. Increasing the number of sources of information related to incidents also doesn't always help in solving the problem because it takes time to add them to the SOC. In addition, the specialists themselves may not always have enough time and expertise to identify and process important artifacts, since there can be thousands of artifacts themselves. This problem is especially relevant in the case of an APT (Advanced Persistent Threat) attack, when the incident patterns may be unknown to both SOC specialists and SIEM systems.

There are various automatic systems for processing information on computer incidents. However, well-known systems cannot solve the problem described above, which is associated with a lack of time and expertise on the part of both specialists and information systems. Threat researchers often publish the results of their investigations (tactics, techniques, and procedures of attackers) online in the form of reports, presentations, blog articles, tweets, and other content. It takes a long time before this knowledge is systematized and applied within SOC teams and SIEM solutions.

Therefore, there is a need for a method and a system for improving usage of large language models in security monitoring and incident response.

SUMMARY

Aspects of the disclosure relate to systems and methods for security monitoring and incident response by using large language models.

In one exemplary aspect, a method for security monitoring and incident response by using large language models is disclosed, the method comprising: receiving input data from one or more elements of Security Operations Center (SOC); generating a query based on the received input data and sending the generated query to a Large Language Model (LLM); receiving a response from LLM and parsing the response received from the LLM; and performing analysis of the response received from the LLM to determine whether a threat has been identified based on results of the received response from the LLM.

In one aspect, the method further comprises: when a threat is identified, collecting artifacts of the threat using elements of the SOC, and analyzing the threat further within the SOC with involvement of security professionals; when a threat is not identified, determining whether additional data is needed for LLM, and when additional data is needed, determining a type of the additional data that is needed; when the type of additional data that is determined, collecting additional information at least from one of the elements of the SOC; and when additional data is not needed for the LLM or when the type of additional data is not determined, terminating the security monitoring and incident response.

In one aspect, the additional data is determined based on a presence of at least one of a list of certain phrases in the response received from the LLM.

In one aspect, the parsing of the response received from the LLM is performed using any number of natural language processing libraries.

In one aspect, the parsing of the response received from the LLM is performed using a set of regular expressions to identify text elements.

In one aspect, the element of the security monitoring center is a Security Information and Event Management (SIEM).

In one aspect, the element of the information security monitoring center is an Endpoint Detection and Response (EDR).

According to one aspect of the disclosure, a system is provided for security monitoring and incident response by using large language models, the system comprising at least one memory; and at least one hardware processor coupled with the at least one memory and configured, individually or in combination, to: receive input data from one or more elements of Security Operations Center (SOC); generate a query based on the received input data and send the generated query to a Large Language Model (LLM); receive a response from LLM and parse the response received from the LLM; and perform analysis of the response received from the LLM to determine whether a threat has been identified based on results of the received response from the LLM.

In one exemplary aspect, a non-transitory computer-readable medium is provided storing a set of instructions thereon for security monitoring and incident response by using large language models, wherein the set of instructions comprises instructions for: receiving input data from one or more elements of Security Operations Center (SOC); generating a query based on the received input data and sending the generated query to a Large Language Model (LLM); receiving a response from LLM and parsing the response received from the LLM; and performing analysis of the response received from the LLM to determine whether a threat has been identified based on results of the received response from the LLM.

The method and system of the present disclosure are designed to improve security monitoring and incident response by using large language models. The technical result of the present method is to reduce the time of collection and increase the level of processing of information (artifacts) during the investigation of an information security incident.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for security monitoring and incident response by using large language models in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 3:
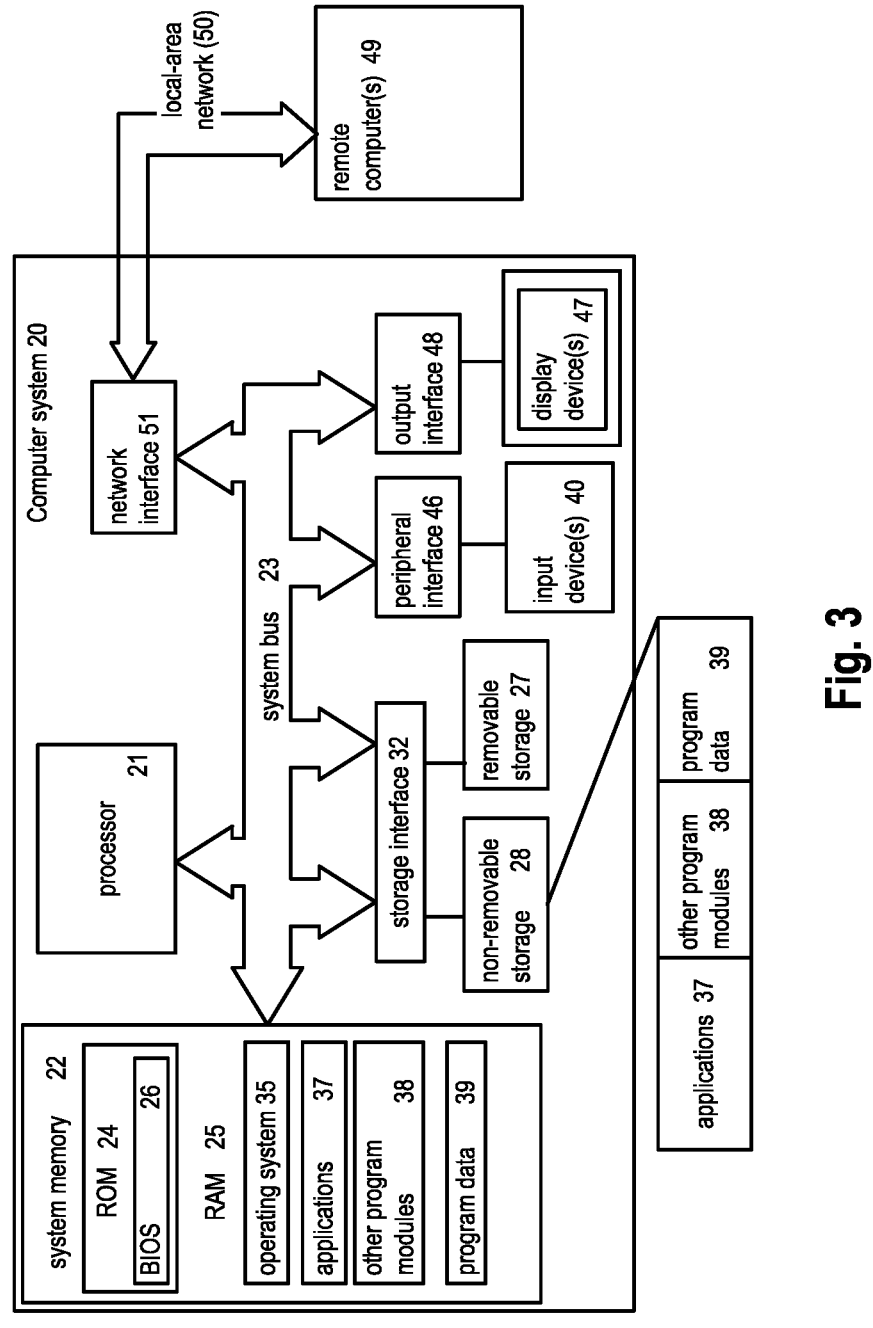
FIG. 3 presents an example of a general purpose computer system on which aspects of the present disclosure for security monitoring and incident response by using large language models can be implemented.

In some aspects of the present disclosure, some or all of the system for security monitoring and incident response by using large language models may be implemented on the processor of a general-purpose computer (which, for example, is depicted in FIG. 3). In this case, the components of the system may be realized within a single computing device, or distributed amongst several interconnected computing devices.

In order to clearly describe the teachings of the present disclosure, a glossary of terms and concepts is first provided below.

The Security Operations Center (SOC) comprises a structural unit of the organization responsible for the operational monitoring of the IT environment and the prevention of information security incidents (hereinafter referred to as incidents). SOC specialists collect and analyze data from various objects of the organization's infrastructure and, if suspicious activity is detected, take measures to prevent an attack. For monitoring and data collection, the following elements are used: SIEM solutions, EDR products, NDRs, and the like (hereinafter referred to as SOC elements). In addition, the SOC also uses services such as the Threat Intelligence Platform as described, for example, in a document by Kaspersky that may be found at https://encyclope-dia.kaspersky.ru/glossary/threat-intelligence/.

SIEM (Security Information and Event Management) refers to a class of software products designed to collect and analyze information about security events. The tasks of SIEM systems include:

Monitoring real-time security alerts from networked devices and applications;

Processing the received data and find relationships between them;

Identifying deviations from the normal behavior of controlled systems; and

Alerting SOC specialists about detected incidents.

EDR (Endpoint Detection & Response) refers to a class of solutions for detecting and learning malicious activity on endpoints: networked workstations, servers, Internet of Things (IoT) devices, and so on.

A SOC specialist (information security professional) is an employee responsible for collecting and analyzing data related to incidents. As a rule, information security professionals or specialists work within the framework of the SOC with products at the level of SIEM, EDR, and other means of data collection and incident tracking.

In the field of computer security, an Indicator of Compromise (IoC) refers to an object or activity observed on a network or on a specific device, which with a high degree of probability indicates unauthorized access to the system, which also indicates that the object or activity has been compromised.

For example, the following factors act as an indicator of compromise:

Unusual DNS queries;

Suspicious files, applications, and processes;

IP addresses and domains belonging to botnets or malicious C&C servers;

A significant number of login attempts (brute-force attempts);

Suspicious activity in administrator or privileged user accounts;

Unexpected software update;

Installation of unauthorized (illegitimate) software;

Transfer data over seldomly used ports;

Atypical human behavior on the website;

The signature or hash sum of the malware;

Unusual size of HTML responses;

Unauthorized modification of device configuration files, registries, or settings.

A large language model (LLM) is a language model consisting of a neural network with many parameters (usually billions of weights or more) trained on a large number of texts. Thus, the query is sent to the LLM that is trained to process, for instance, natural language, where the trained is performed using a neural network with a plurality of parameters and respective weights, and a large number of texts. For example, the LLM that is processing natural language may be trained using billions or more parameters and weights, and a large number of texts.

Figure 1:
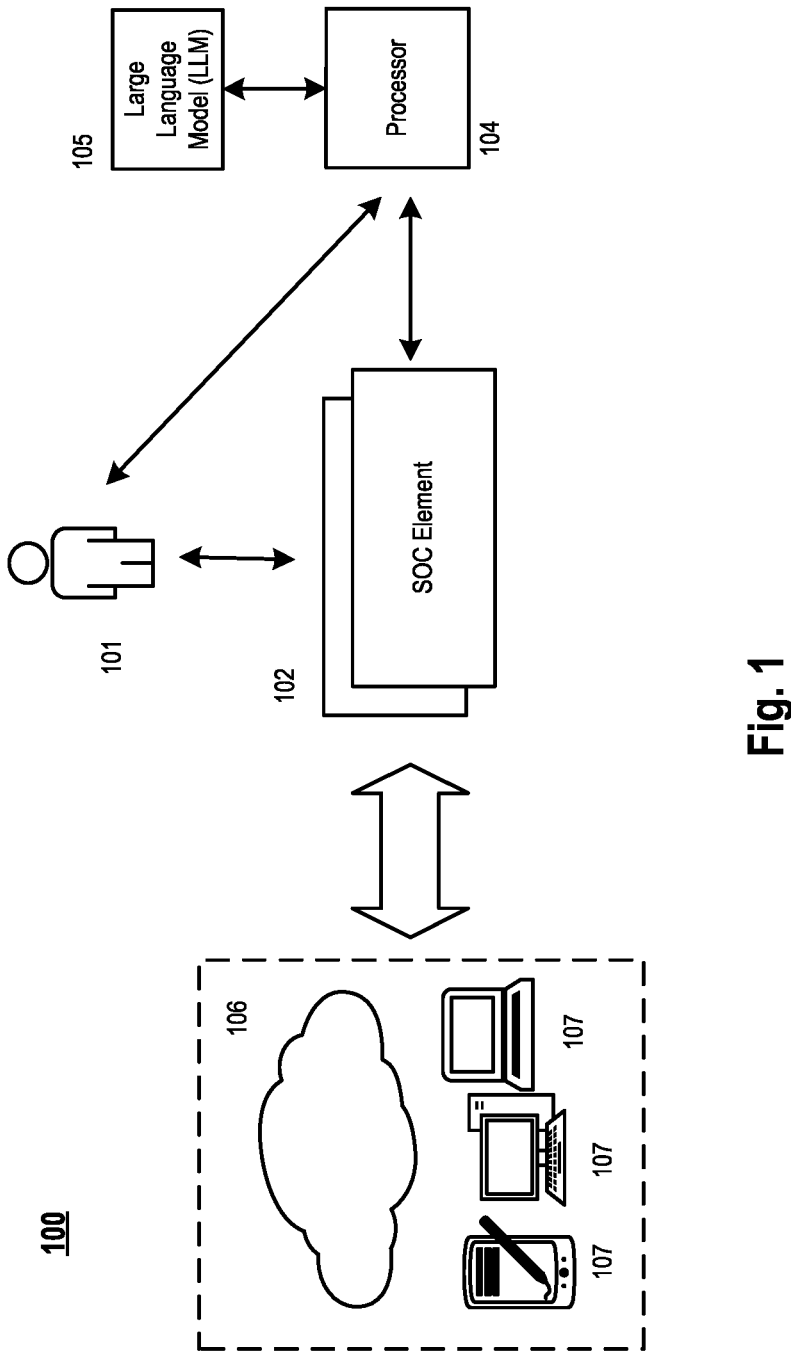
FIG. 1 illustrates a block diagram of an exemplary system for security monitoring and incident response by using large language models in accordance with aspects of the present disclosure.

FIG. 1 illustrates a block diagram of an exemplary system 100 for security monitoring and incident response by using large language models in accordance with aspects of the present disclosure. The system 100 comprises elements of the SOC 102. Security professionals 101 and the elements of the SOC 102 interact with a trained LLM 105 through a request processor 104. The elements of the SOC 102 comprise: SIEM solutions, EDR products, and the like. In one aspect, the information security professionals 101 interacts with LLM 105 through the web interface of the request processor 104. The elements of the SOC 102 collect data from endpoint devices 107 of an enterprise infrastructure 106 to collect and analyze information about security events. Examples of endpoint devices 107 include computers (hosts) and devices such as smartphones, routers, and IoT devices. In a preferred aspect, the EDR solutions are installed on the endpoint devices 107.

The enterprise infrastructure 106 may also include other devices not mentioned in FIG. 1, namely access control systems, SCADA (Supervisory Control and Data Acquisition), PLC (Programmable Logic Controller) units, and other hardware and software systems of a modem enterprise.

In one aspect, LLM 105 operates on the basis of natural language queries. In this case, the request processor 104 performs the functions of translating I/O requests from elements of the SOC into the input format required by the LLM and vice versa (e.g., JSON/XML).

In another aspect, LLM 105 is additionally trained on texts taken from various blogs, articles, and publications related to information security incidents (e.g., DFIR Report) and threat research (e.g., securelist.com).

The request processor 104 is also used to store the context that is used when interacting with LLM 105 in the form of request-response so that the effectiveness of the interaction with LLM 105 is maximized. The context includes all previous requests to LLM 105 as well as the responses received.

In one aspect, the request processor 104 is implemented using natural language processing libraries such as SpaCy, NTLK, and others. In another aspect, the request processor 104 uses a set of regular expressions to extract text elements from received responses from LLM 105. A token, N-gram, or lexeme is used as a text element.

Security professionals 101 and elements of the SOC 102 transmit, to the request processor 104, data collected from one or more endpoint devices 107 about:

Modules configured for automatic execution (autorun);

Running processes and their command lines (arguments);

Events from the operating system (OS) logs: service installations, process starts, PowerShell script executions, etc.;

Events from application logs (antivirus, browser, or remote system management);

Meta-information on files (processes and system files): name, path, hash, meta-information from the manifest (original name, description, developer's name), information on the digital signature, code strings from the file, debugging information, section names, disassembled/decompiled code of entry points into the executable file (or exported by the DLL), part of the text-file of script; and File execution information (e.g., in an emulator or in a virtual machine), which includes a log of system API function calls and their arguments, as well as additional information such as open files descriptors (handlers).

In one aspect, the LLM 105 cannot correctly accept such data as input, so the request processor 104 converts this data into requests of the following type:
1) Is the following Windows service name '$Service-Name' followed by the next startup line '$Servicecmd' an indicator of compromise?
2) Is any of the following Windows services with appropriate command lines an indicator of compromise?

```
[
    {
        "ServiceName": "ServiceName1",
        "Servicecmd": "Servicecmd1"
    },
    {
        "ServiceName": "ServiceName2",
        "Servicecmd": "Servicecmd2"
    },
]
```

The response from LLM 105 includes a textual description that can be easily interpreted by the information security professionals 101. For instance, a sample answer may be:
"Yes, the specified combination of running process and command line may be an indicator of compromise."

LLM 105 also provides information for the response, such as, for example:
"The metadata was indicators of compromise, such as 'the command line is trying to download a file from an external server' or 'it is using the -ep bypass flag which instructs PowerShell to bypass standard security checks.'"

The request processor 104 interprets the response from LLM 105 by highlighting the key phrases. An example of such a phrase is a response that includes the words "yes," which gives an affirmative answer to the original queries. In addition, to simplify the interpretation of the response from LLM 105, the request processor 104 adds the following text to the request:

```
Your response should be a json object with the following structure:
{short_answer: "yes/no",
long_answer_with description:full_text,
other_data_required_to_investigate_incident:full_text
}
```

When such key phrases are detected, request processor 104:
transmits an alert signal to elements of the SOC 102 as well as to the information security professionals 101;
sends a request to collect additional data from one of the endpoint devices 107 on which the original data for the request was collected; and
starts (triggers) response measures (e.g., blocks one or more endpoint devices 107, e.g., hosts).

Thus, the request processor 104 works with LLM 105 in a question-and-answer pattern, where it uses key phrases to construct questions as part of LLM 105 queries, and relies on key phrase search to find an affirmative answer to the original question or to determine the need for additional questions when analyzing the responses from LLM 105.

Figure 2:
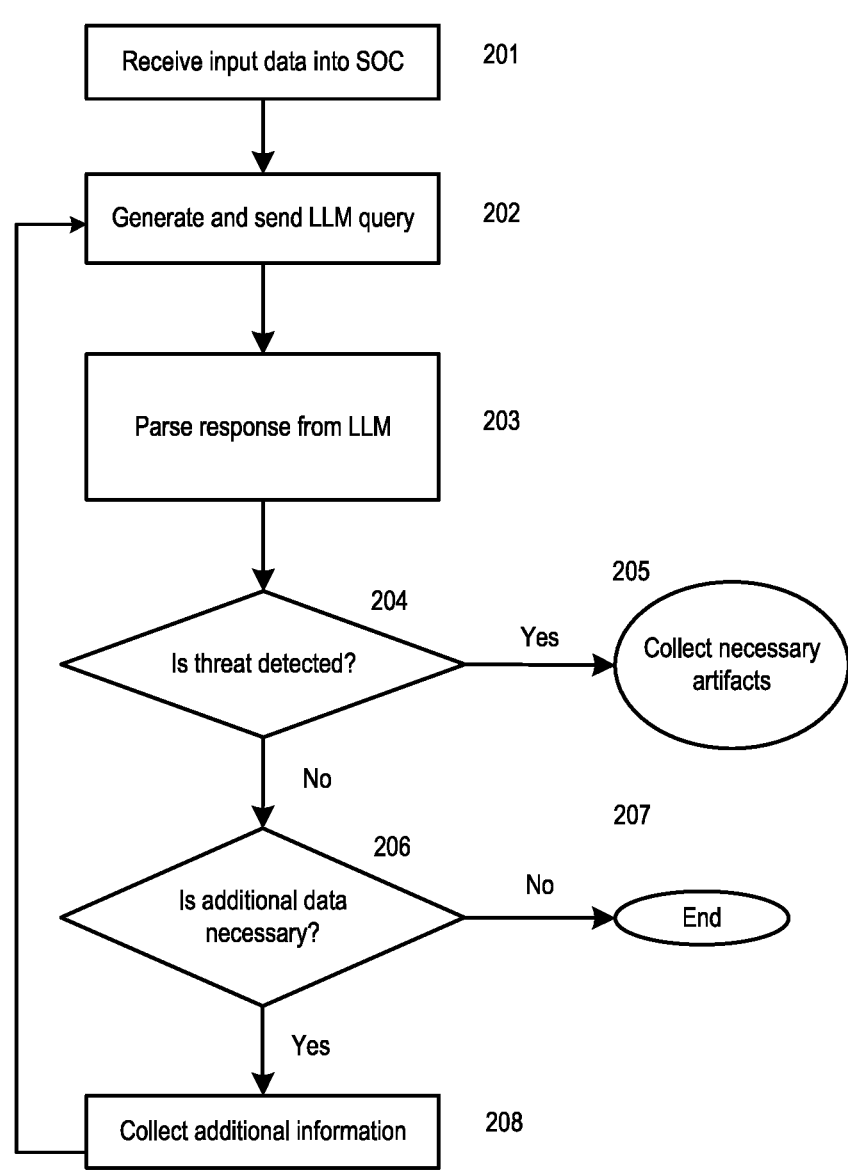
FIG. 2 illustrates an example of a method for security monitoring and incident response by using large language models in accordance with aspects of the present disclosure.

FIG. 2 illustrates an example of a method 200 for security monitoring and incident response by using large language models in accordance with aspects of the present disclosure.

In step 201, method 200 receives input from one or more elements of the Security Operations Center (SOC). Typically, elements of the SOC 102 collect input (examples of data collected are described above) from the endpoint devices 107 of the enterprise infrastructure 106.

In step 202, method 200 generates a query based on the received input and sends the query to LLM 105. Because queries to LLM 105 are generated in natural language, the request processor 104 adds the following key phrases to the input:

"Is the combination of:"—specifies the enumeration of the required data,

"is an indicator of compromise", "is a threat", "is an attack", "is a cyber attack", "is malicious action/file"— a question about the threat, "think it step by step"—a requirement to give an answer broken down by steps, "is a presence file on disk"—a query for a specific file.

These phrases are stored both in the request processor 104 itself (e.g., as a list) and in a separate database (not displayed in FIG. 1).

Queries, for example, might look like this:

Is the combination of process "C:\Users\User01\AppData\Local\Temp\dOlnolh.exe" and command line "—EgUxRCdQ" is an indicator of compromise?

According to the submitted request, the input data is:

| Object type | Object |
| --- | --- |
| Process | C:\Users\User01\AppData\Local\Temp\dOlnolh.exe |
| Command line | -EgUxRCdQ |

Data about the process and the command line for its start were obtained from an EDR installed on one of the endpoint devices 107, such as hosts. The request processor 104 enumerates the specified objects in the request and adds the above key phrases to construct the natural language query.

In step 203, by the request processor 104, method 200 receives a response from LLM 105 and parses the received response. Because LLM 105 outputs a response as natural language text, the request processor 104 uses connected natural language processing libraries, such as SpaCy or NTLK, to highlight the desired terms and phrases. Analysis involves highlighting pre-known phrases or text elements. A token, N-gram, or lexeme is used as a text element. In one aspect, highlighting known phrases is implemented using regular expressions.

In step 204, method 200 determines whether a threat has been identified based on the results of an analysis of the parsed received response from LLM 105. The criterion for identifying a threat is based on determining the presence of certain phrases in the response. For example, in one implementation, the determination is based on searching for the words "yes" and other affirmative answers in the response. Other key phrases that may be similarly used are: "This could be an indicator of compromise", "This is suspicious behavior". If a threat is identified, method 200 proceeds to step 205. If no threat is identified in step 204, method 200 proceeds to step 206.

In step 205, method 200 collects artifacts of the threat using elements of the SOC 102, and analyzes the incident/threat further within the SOC with involvement of security professionals 101. In one aspect, the method terminates after step 205. In another aspect, the method proceeds to step 206 to assess whether more data is needed.

In step 206, method 200 determines whether more data is needed for LLM 105 and determines what type of additional data is needed, if applicable. For example, key phrases in this case may include: "should be further investigated", "additional data required", "necessary to analyzefurther" and other similar phrases. The specified phrases are stored in the request processor 104 itself (e.g., as a list) and in a separate database (not shown in FIG. 1). In addition, it is analyzed what type of information is required depending on the presence of the following words:

Endpoint, host, local—means the need to collect information from endpoint devices 107, e.g., hosts;

Registry—requires information from the registry;

File—requires information about file activity;

Network—network activity information is required;

Process—process information is required;

Autorun—requires more information about autorun keys; and

PowerShell—optional analysis of PowerShell scripts is required.

In one aspect, in addition, the context associated with these words is analyzed. For example, the word "process" can be defined as "running process", which means only running processes.

In the event that the request processor 104 is unable to identify what additional data may be needed, the method proceeds from step 206 to step 207. Otherwise, once the necessary additional information has been determined, method 200 proceeds from step 206 to step 208.

In step 207, method 200 is terminated.

In step 208, method 200 collects additional information at one of the elements of the SOC 102. For example, an EDR solution may be used to collect information from one of the endpoint devices 107, e.g., from hosts. The method then proceeds to step 202 with the newly collected data until the method completes its operation at either step 205 or 207.

In one aspect, the LLM 105 in FIG. 1 can be further trained. One or more target endpoint devices 107, e.g., hosts (which may include virtual machines and sandbox objects) are targeted for malware samples to be infected. For example, one can install the Empire PowerShell framework and run a few common malicious routines. After that, the method according to FIG. 2 may be used to highlight the necessary requests and responses from LLM 105.

For example, in response to a query:

Is the following is indicator of compromise:
Launch String:
  "C:\Windows\System32\WindowsPowerShell\v1.0\powershell.exe" -
  NonI -W hidden -c "IEX ([Text.Encoding]::UNICODE.
  GetString([Convert]::FromBase64String((gp
  HKCU:\Software\Microsoft\Windows\CurrentVersion debug).debug)))".

Then, the LLM 105 returns the following response:

Yes, this could be an indicator of compromise. It is possible that the attacker has created a malicious task in the registry to launch PowerShell with a hidden flag and encoded base64 string. This code could potentially execute malicious commands on the system, such as installing malware or stealing data. In order to confirm if this indeed an indicator of compromise, it would be necessary to analyze script further and look for other clues that indicate malicious activity.

This answer means:

"Yes, it can be an indicator of compromise. An attacker may have created a malicious registry task to run PowerShell with a hidden flag and a base64 encoded string. This code could potentially execute malicious commands on the system, such as installing malware or stealing data. In order to confirm whether this is indeed an indicator of compromise, it is necessary to analyze the scenario further and look for other signs of malicious activity."

Thus, in one aspect, by making several sequential queries to LLM 105 with various parameters that relate to malicious activity on endpoint devices 107, e.g., hosts, and by obtaining the necessary responses, it is possible to supplement the context that will be used in the retraining of LLM 105.

FIG. 3 is a block diagram illustrating a computer system 20 on which aspects of systems and methods for security monitoring and incident response by using large language models may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 3 above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for security monitoring and incident response by using large language models, the method comprising:
receiving input data from one or more elements of Security Operations Center (SOC);
generating a query based on the received input data and sending the generated query to a Large Language Model (LLM) that is trained on texts related to information security incidents and threat research;
receiving a response from the LLM and parsing the response received from the LLM; and
performing analysis of the response received from the LLM to determine whether a threat has been identified based on results of the received response from the LLM;
when the threat is identified, collecting artifacts of the threat using elements of the SOC, and analyzing the threat further within the SOC with involvement of security professionals;
when the threat is not identified:
determining whether additional data is needed for the LLM to identify the threat based on a presence of at least one of a list of certain phrases in the response received from the LLM; and
collecting the additional data from at least one of the elements of the SOC when the additional data is needed.

2. The method of claim 1, further comprising:
when additional data is needed, determining a type of the additional data that is needed;
when the type of additional data is determined, collecting additional data of that type at least from one of the elements of the SOC; and
when additional data is not needed for the LLM or when the type of additional data is not determined, terminating the security monitoring and incident response.

3. The method of claim 1, wherein the parsing of the response received from the LLM is performed using any number of natural language processing libraries.

4. The method of claim 1, wherein the parsing of the response received from the LLM is performed using a set of regular expressions to identify text elements.

5. The method of claim 1, wherein the element of the SOC is a Security Information and Event Management (SIEM).

13

6. The method of claim 1, wherein the element of the SOC is an Endpoint Detection and Response (EDR).

7. The method of claim 1, wherein the LLM is further trained by:

installing a malicious object and running a malicious routine on an endpoint device;

inputting a malware query associated with the endpoint device into the LLM to generate an output response, wherein the query has a necessary response indicative of the malicious routine and/or malicious object; and training the LLM based on whether the output response is the necessary response.

8. A system for security monitoring and incident response by using large language models, comprising:

at least one memory; and at least one hardware processor coupled with the at least one memory and configured, individually or in combination, to:

receive input data from one or more elements of Security Operations Center (SOC);

generate a query based on the received input data and send the generated query to a Large Language Model (LLM) that is trained on texts related to information security incidents and threat research;

receive a response from the LLM and parse the response received from the LLM; and perform analysis of the response received from the LLM to determine whether a threat has been identified based on results of the received response from the LLM;

when the threat is identified, collect artifacts of the threat using elements of the SOC, and analyzing the threat further within the SOC with involvement of security professionals;

when the threat is not identified:

determine whether additional data is needed for the LLM to identify the threat based on a presence of at least one of a list of certain phrases in the response received from the LLM; and collect the additional data from at least one of the elements of the SOC when the additional data is needed.

9. The system of claim 8, the at least one hardware processor further configured to:

when additional data is needed, determine a type of the additional data that is needed;

when the type of additional data is determined, collect additional data of that type at least from one of the elements of the SOC; and when additional data is not needed for the LLM or when the type of additional data is not determined, terminate the security monitoring and incident response.

10. The system of claim 8, wherein the parsing of the response received from the LLM is performed using any number of natural language processing libraries.

11. The system of claim 8, wherein the parsing of the response received from the LLM is performed using a set of regular expressions to identify text elements.

12. The system of claim 8, wherein the element of the SOC is a Security Information and Event Management (SIEM).

13. The system of claim 8, wherein the element of the SOC is an Endpoint Detection and Response (EDR).

14. A non-transitory computer readable medium storing thereon computer executable instructions for security monitoring and incident response by using large language models, including instructions for:

receiving input data from one or more elements of Security Operations Center (SOC);

generating a query based on the received input data and sending the generated query to a Large Language Model (LLM) that is trained on texts related to information security incidents and threat research;

receiving a response from the LLM and parsing the response received from the LLM; and performing analysis of the response received from the LLM to determine whether a threat has been identified based on results of the received response from the LLM;

when the threat is identified, collecting artifacts of the threat using elements of the SOC, and analyzing the threat further within the SOC with involvement of security professionals;

when the threat is not identified:

determining whether additional data is needed for the LLM to identify the threat based on a presence of at least one of a list of certain phrases in the response received from the LLM; and collecting the additional data from at least one of the elements of the SOC when the additional data is needed.

15. The non-transitory computer readable medium of claim 14, the instructions for security monitoring and incident response by using large language models, further including instructions for:

when additional data is needed, determining a type of the additional data that is needed;

when the type of additional data is determined, collecting additional data of that type at least from one of the elements of the SOC; and when additional data is not needed for the LLM or when the type of additional data is not determined, terminating the security monitoring and incident response.

16. The non-transitory computer readable medium of claim 14, wherein the parsing of the response received from the LLM is performed using any number of natural language processing libraries.

17. The non-transitory computer readable medium of claim 14, wherein the parsing of the response received from the LLM is performed using a set of regular expressions to identify text elements.

18. The non-transitory computer readable medium of claim 14, wherein the element of the SOC is a Security Information and Event Management (SIEM).

* * * * *